(12) United States Patent
Muckenhirn

(10) Patent No.: US 10,260,413 B2
(45) Date of Patent: Apr. 16, 2019

(54) MULTI-STAGE COMBUSTION HOT-GAS/STEAM PRESSURE-DIFFERENTIAL PARALLEL-CYLINDER OPPOSED-PISTON ENGINE FOR NATURAL GAS, HYDROGEN AND OTHER FUELS WITH INTEGRATED ELECTRIC GENERATOR

(71) Applicant: Ralf Muckenhirn, Munstertal (DE)

(72) Inventor: Ralf Muckenhirn, Munstertal (DE)

( * ) Notice: Subject to any disclaimer, the term of this patent is extended or adjusted under 35 U.S.C. 154(b) by 156 days.

(21) Appl. No.: 15/193,548

(22) Filed: Jun. 27, 2016

(65) Prior Publication Data

US 2017/0009884 A1  Jan. 12, 2017

(30) Foreign Application Priority Data

Jul. 7, 2015 (DE) .................. 10 2015 008 556

(51) Int. Cl.

| | | |
|---|---|---|
| *F01B 7/12* | (2006.01) | |
| *F02B 75/28* | (2006.01) | |
| *F01B 5/00* | (2006.01) | |
| *F01B 7/02* | (2006.01) | |
| *F02B 63/04* | (2006.01) | |
| *F02B 75/02* | (2006.01) | |

(52) U.S. Cl.
CPC ............... *F02B 75/28* (2013.01); *F01B 5/00* (2013.01); *F01B 7/02* (2013.01); *F01B 7/12* (2013.01); *F02B 63/041* (2013.01); *F02B 2075/025* (2013.01); *Y02T 10/16* (2013.01)

(58) Field of Classification Search
CPC .. F01B 11/001; F01B 1/06; F01B 7/12; F01B 9/04; F01B 7/04; F01B 7/08; F01B 13/06; F01B 1/0603; F01B 23/10; F01B 5/00; F01B 9/026; F03C 1/04; F03C 1/247
USPC ......... 123/51 B, 53.6, 55.2, 55.4, 55.5, 58.1, 123/197.1–197.3, 56.1, 56.2
See application file for complete search history.

(56) References Cited

U.S. PATENT DOCUMENTS 2,215,202 A * 9/1940 Wormley ................ F02B 75/28
                                                                  123/53.3
2,268,532 A * 12/1941 Goodman ................. F01B 7/14
                                                                  123/51 A (Continued)

FOREIGN PATENT DOCUMENTS

DE      66961      7/1892

OTHER PUBLICATIONS

Giurca, Liviu, Hybrid Opposite Piston Engine—HOPE & Portable Range Extender, 2 pages, www.hybrid-engine-hope.com.state_of_art. (admitted prior art, printed Aug. 24, 2016).

(Continued)

*Primary Examiner* — Marguerite McMahon
*Assistant Examiner* — Tea Holbrook
(74) *Attorney, Agent, or Firm* — Volpe and Koenig, P.C.

(57) ABSTRACT

A five-spindle engine system having a stable center of gravity that operates without oil lubrication, an opposed-piston four-cylinder, two-stroke combustion engine, a double-acting opposed-piston pressure-gradient drive, a multi-rotor/multi-stator/multi-phase disk generator/disk motor including windings printed on printed circuit boards, and/or a heat pump may be integrated in the system and housed in a common sealed housing.

6 Claims, 6 Drawing Sheets

(56) References Cited

U.S. PATENT DOCUMENTS

| | | | | |
|---|---|---|---|---|
| 2,295,879 A * | 9/1942 | Tucker | F01B 7/12 | 123/51 BB |
| 2,867,375 A * | 1/1959 | Petersen | F02B 75/28 | 417/340 |
| 4,215,660 A * | 8/1980 | Finley | F01B 7/12 | 123/48 B |
| 4,305,349 A * | 12/1981 | Zimmerly | F01B 7/12 | 123/51 B |
| 4,345,550 A * | 8/1982 | Finley | F01B 7/12 | 123/48 B |
| 4,776,304 A * | 10/1988 | Korosue | F02B 75/222 | 123/197.4 |
| 4,869,212 A * | 9/1989 | Sverdlin | F01B 1/12 | 123/51 B |
| 5,375,567 A * | 12/1994 | Lowi, Jr. | F01B 3/045 | 123/56.8 |
| 5,507,253 A * | 4/1996 | Lowi, Jr. | F01B 3/045 | 123/56.9 |
| 6,279,520 B1 * | 8/2001 | Lowi, Jr. | F01B 3/045 | 123/56.1 |
| 6,575,125 B1 * | 6/2003 | Ryan | F01B 3/0005 | 123/56.1 |
| 6,948,458 B2 * | 9/2005 | Ariyakunakorn | F01B 3/04 | 123/241 |
| 8,015,956 B2 * | 9/2011 | Gaiser | F01B 3/0002 | 123/56.1 |
| 8,127,471 B2 | 3/2012 | Stevens et al. | | |
| 8,464,671 B2 * | 6/2013 | Zhou | F01B 9/042 | 123/197.1 |
| 2003/0205211 A1 * | 11/2003 | Cannata | F02B 75/26 | 123/56.1 |
| 2006/0060165 A1 * | 3/2006 | Gerfast | F16J 1/02 | 123/195 R |
| 2007/0186880 A1 * | 8/2007 | Gaiser | F01M 1/02 | 123/55.5 |
| 2008/0105222 A1 * | 5/2008 | Kubes | F01B 3/0005 | 123/52.1 |
| 2010/0307449 A1 * | 12/2010 | Reisser | F01C 9/002 | 123/244 |
| 2011/0011375 A1 * | 1/2011 | Carlson | F01B 3/0005 | 123/559.1 |
| 2011/0083644 A1 * | 4/2011 | Dougherty | F02B 75/24 | 123/51 R |
| 2014/0165967 A1 * | 6/2014 | Bucksey | F01B 7/08 | 123/46 A |
| 2014/0196693 A1 * | 7/2014 | Bucksey | F01B 7/08 | 123/51 R |

OTHER PUBLICATIONS en.wikipedia.org/widi/Opposed-piston_engine, pp. 1-8, (admitted prior art, printed Aug. 24, 2016).

www.printedmotorworks.com, 2 pages, (admitted prior art, printed Aug. 24, 2016).

www.heinzmann.com, Heinzmann—Specialist for Engine & Turbine Management (admitted prior art, printed Aug. 24, 2016).

Vogel & Ploetscher Electric Motors (admitted prior art, printed Aug. 25, 2016).

\* cited by examiner

Fig. 1.1
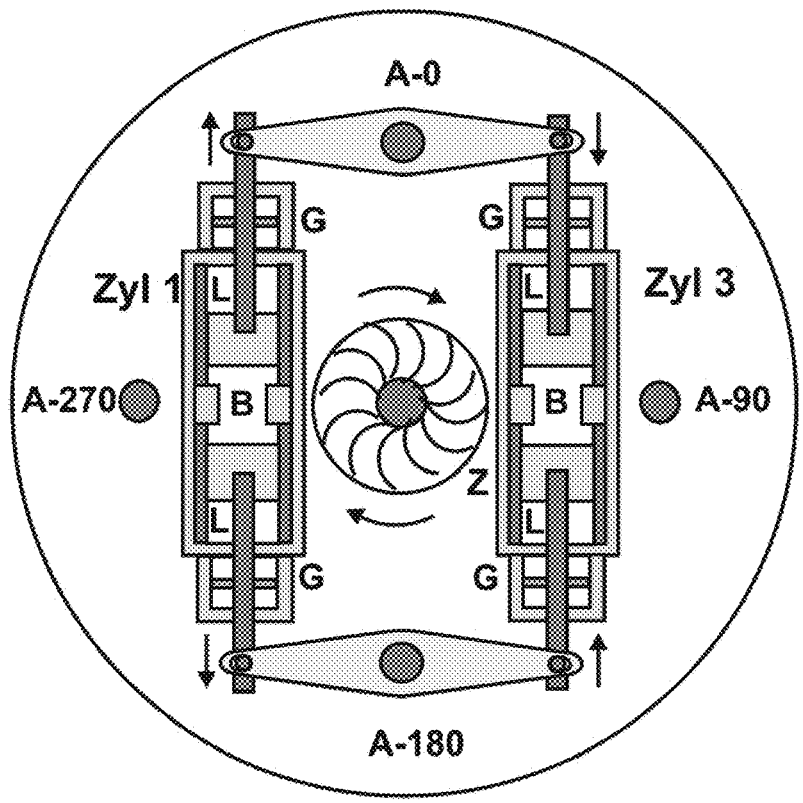
Fig. 1.2
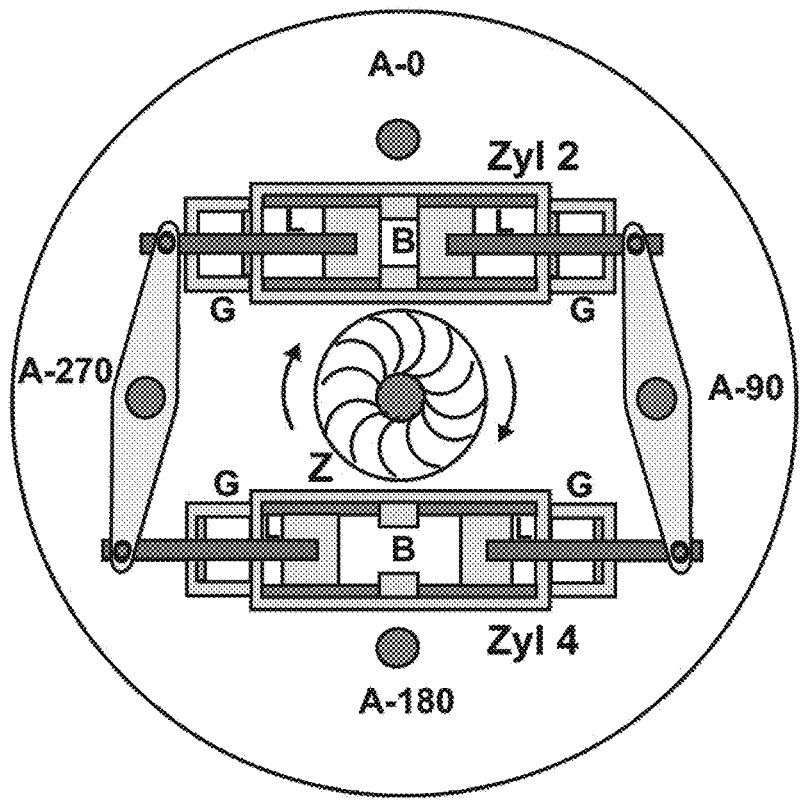

Fig. 2.1
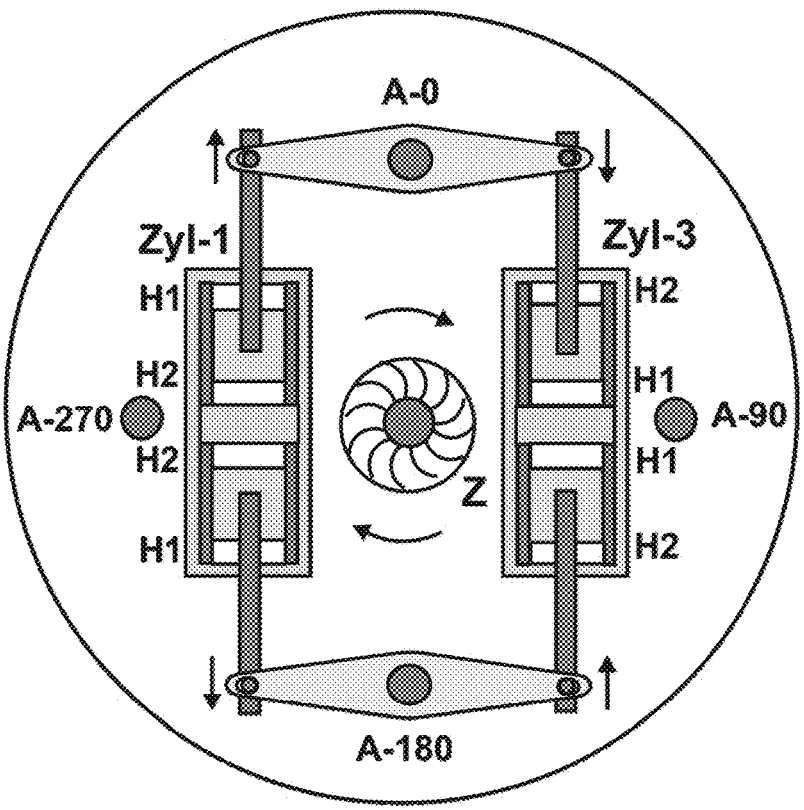
Fig. 2.2
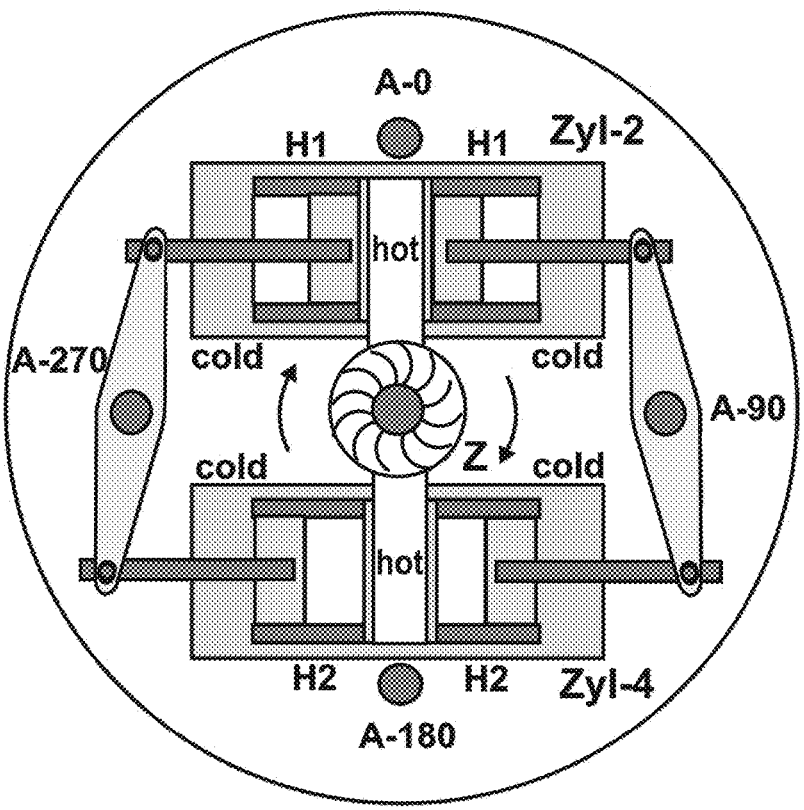

MULTI-STAGE COMBUSTION HOT-GAS/STEAM PRESSURE-DIFFERENTIAL PARALLEL-CYLINDER OPPOSED-PISTON ENGINE FOR NATURAL GAS, HYDROGEN AND OTHER FUELS WITH INTEGRATED ELECTRIC GENERATOR

INCORPORATION BY REFERENCE

The following documents are incorporated herein by reference as if fully set forth: German Patent Application No. 102015008556.5, filed Jul. 7, 2015.

SUMMARY

A system is provided which includes parallel and at the same time partly 90-degree-offset opposed-piston engine stages, four of which are configured as two-stroke combustion engines, two being arranged offset by 90 degrees. In two-stroke operation, four working cycles per revolution of the central spindle are obtained. To make further use of the energy contained in the exhaust gas, the combustion engine system is supplemented by opposed-piston systems, one or more of which are configured as condensation-assisted double-acting push-pull opposed-piston hot-gas/steam engine systems (Stirling principle) and one or more others of which are configured as double-acting opposed-piston pressure-differential drives (steam engine/compressed-air motor principle). In addition, the motive energy of the gas emerging from the combustion pistons can act by way of a turbine or a comparable drive directly on the central rotary spindle and be used.

The two or more pistons in parallel-arranged cylinders of one level are connected by way of outer rockers, which are attached on opposite rocking spindles, in such a way that both the pistons with their piston rods and the rockers move in such a way in the movement of their mass that overall the center of gravity remains at the same point with respect to the central spindle, whereby vibrations are largely avoided. The piston rods are connected to the rocker (for example by way of a rotatably mounted eccentric) in such a way that the piston movement can take place completely parallel to the cylinder, although the connecting point on the rocker also has a small movement component at right angles to the piston movement.

The four outer rocking spindles are disposed around a central rotary spindle, to which they are connected by a quadruple cruciform connecting rod system, which coordinates the rotating movement of the central rotary spindle by way of an eccentric with the rocking movements of the four outer spindles. Three of the four arms of the cruciform connecting rod are connected in a rockable manner, one is fixed (cf. radial engine). The outer rockers of the cruciform connecting rod system are angularly offset with respect to the rockers of the cylinders (which are aligned at right angles in the direction of the piston movement) in such a way that the movement takes place perpendicularly at the connecting point with the connecting rod and tangentially opposed in pairs on the other side in relation to the central rotary spindle, whereby here too the center of gravity remains largely in the middle of the rotary spindle. In this way, the system is very stable in terms of its center of gravity, and consequently has low vibration, even in the case of the cruciform connecting-rod eccentric drive.

All of the components of the system are arranged in such a way that speeds and the forces transverse to the direction of movement are minimized. The pistons and bearings are made of graphite or other material that does not require lubrication, can be lubricated with water, are provided with permanent lubrication, or slide on an air cushion. Operation in an atmosphere that is isolated from the surroundings in terms of pressure, temperature, and the gas composition make a lightweight construction and the use of lightweight materials possible, because, for example in the case of a basic pressure of 5 bar and a relatively high proportion of oxygen and combustion gas in the combustion chamber, computationally the compression of the combustion engine only has to be 1:3 to 1:2.

A special disk generator/disk electric motor with one or more permanent-magnet disk rotors and stators made up of layers of printed circuit boards supplements the system and opens up further potential for optimization. Thus, the permanent-magnet disks are at the same time the flywheel and the fan. At the same time, they make it possible for the gas to be conditioned in the generator by using centrifugal forces and magnetic forces and allow optimal cooling inside the generator. The usual wire windings are replaced by windings that are printed on multiple levels of multiple stacked printed circuit boards. The use of printed circuit boards inside the generator at the same time makes it possible to accommodate control components, sensor systems and computer intelligence directly within the winding system. As a result, star and delta connections, but also parallel and series connections of the windings can be switched in a computer-aided manner according to requirements in single- or multi-phase operation and also mixed within the winding system.

All of the components may also be used independently of one another, for example for optimizing other drive systems, especially since the combined use of the additional components particularly maximizes the overall efficiency in comparison with the combustion engine stage considered on its own. The pressure-differential stages may be used as pumps, the hot-gas stage as a heat pump for cooling or heating and the electric motor/generator may replace conventional electric motors or generators.

As a result of the crankshaft and the connecting rods, conventional combustion engines have high moments of force perpendicularly to the piston movement in the cylinder. In the case of many engines, the force of expansion of the combustion gas mixture also acts on one side against the cylinder head. Opposed-piston engines make better use of these forces, but lose some of the advantage due to the complex linkage or transmission for the coordination of the opposed piston movement. Better combustion is generally only assisted by pre-compression (turbocharging of the cylinder) or injection. The composition of the combustion air, with an increase in the oxygen component of the mixture and at the same time a reduction in the nitrogen component, is not changed, even though in this way the proportion of the fuel (for example methane, ethanol) in the mixture can also be increased. Thus, more water vapor would occur during the combustion, with the effect not only of increasing the positive pressure (compared with nitrogen), but also of making possible additional use of the negative pressure thereby produced by cooling of the exhaust gas with condensation of the water. In the case of cogeneration of electricity and heat, the increased heat emission due to condensation allows much smaller heat exchangers with the same power. A pressure increase and simultaneous lowering of the temperature of the dried exhaust gas additionally makes condensation and liquid storage of the $CO_2$ component in the exhaust gas possible. This liquid $CO_2$ may then serve as an energy store for an additional compressed-air drive or be collected to be used for extinguishing purposes or chemical processes (for example methanation of hydrogen).

To deliver power according to requirements, conventional engines require transmissions that use up some of the engine power and nevertheless generally do not always help to operate the engine in the optimum speed range. The cylinders are designed in their size to produce maximum power and during normal operation are reduced in their power by reducing the filling of the cylinder.

Hybrid drives use the better efficiency of electric generators and electric motors in comparison with a transmission and also make braking energy usable. Both generator operation and motor operation require sophisticated control to allow the power data predefined by the windings of the system to be used as effectively as possible. The winding is in this case generally one-phase or three-phase, although a six-phase winding appreciably reduces losses, especially in the rectification of current and voltage.

The motors and generators with a fixed wire winding are fixed to a specific voltage and power at an intended rotational speed. Both the production and repair of windings is very complex.

The multi-stage combustion hot-gas/steam pressure-differential parallel-cylinder opposed-piston engine for natural gas, hydrogen and other fuels with integrated electric generator is distinguished by piston systems that are intrinsically power-optimized and mutually complementary, which open up additional potential for power by the shared use of control and drive components (for example the four rocking spindles and the radial connecting rod connection with the central rotary spindle).

The electric generator is a disk generator, the stators of which are made up of stacks of electric printed circuit boards, which contain windings printed on PCBs that are flexible and directly switchable by way of logic elements applied to the circuit boards. The permanent-magnet rotors serve on the one hand as flywheels for the system, but on the other hand also for conditioning the combustion air as a result of the high speeds and centrifugal forces and as a result of the strong alternating magnetic fields. The combustion air is in this case preheated in the generator and thereby at the same time cools the generator, which additionally has power-increasing and loss-minimizing effects.

The overall system is located in a housing, which allows the engine system also to be operated partly in an environment that is optimized for operation in terms of pressure, material composition and temperature.

Under increased pressure, the CO2 occurring during the combustion also condenses at a correspondingly low temperature, whereby a further pressure-differential drive stage can be operated as a result of the accompanying minimization of the volume. If the engine is operated with compressed natural gas and/or with compressed combustion air (depending on the application also already increased in its oxygen component), the cold that occurs during the expansion additionally assists the condensation/liquefaction of CO2. The compressed CO2 at normal temperature has a high pressure, whereby an additional energy potential is available in the system and thus further increases the overall efficiency. This energy may either be used in the system itself, for example for an additional drive or for starting or maintaining the system pressure, or be passed to be used in other systems.

Since the system gives off its energy in the form of electricity, stored pressure and heat, no moving parts have to be sealed off from the outside. Not only the electricity but also the pressure and heat can be stored, even the stored heat being able to increase the efficiency of the conversion of pressure into motion, for example as a result of its pressure-increasing effect, and thus be partly converted itself again into other forms of energy (for example electrical energy).

BRIEF DESCRIPTION OF THE DRAWINGS

FIG. 1.1 is a schematic view of a first level of a combustion engine stage.

FIG. 1.2 is a schematic view of a second level of the combustion engine stage.

FIG. 2.1 is a schematic view of a next level with a hot-gas engine stage.

FIG. 2.2 is a schematic view of a further level of the hot-gas engine stage.

DETAILED DESCRIPTION OF THE PREFERRED EMBODIMENTS

1. Combustion Engine Stage

On the first level shown in FIG. 1.1 there are the cylinders Zyl 1 and Zyl 3, the pistons of which are respectively connected on one side by way of the rocker on the spindle A-0 and on the other side by way of the rocker on the spindle A-180. Between the pistons lies the combustion chamber (B). On the other side of the pistons, the combustion air (L) is pumped and the fuel (G) is pumped by way of an additional outer pump stage. On the second level shown in FIG. 1.2, the cylinders Zyl 2 and Zyl 4 are connected such that they are offset by 90 degrees by way of the spindles A 90 and A 270. Optionally, the exhaust gases additionally drive the central rotary spindle Z. The feeding of air and fuel and the discharging of the exhaust gases take place in a way analogous to other two-stroke engines, and are therefore not specifically shown here.

2. Hot-Gas Engine Stage

On the next level there is the displacer stage shown in FIG. 2.2 with Zyl-2 and Zyl-4, the pistons of which are respectively moved on one side by way of the rocker on the spindle A-90 and on the other side by way of the rocker on the spindle A-270. Between the pistons lies the region that is heated by the exhaust gases (hot), outside the pistons the region that is cooled by a coolant (cold). When H1 in Zyl-2 is cooled it contracts, at the same time H2 in Zyl-4 is heated and expands. On the next level shown in FIG. 2.1, the working cylinders Zyl-1 and Zyl-3 are connected such that they are offset by 90 degrees by way of the spindles A-0 and A-180. Zyl-1 is connected on the outside and Zyl-3 is connected on the inside to the pistons with H1 of Zyl-2, the other sides with H2 of Zyl-4. The pistons are thus alternately always attracted on one side, while they are at the same time repelled on the other side.

3. Pressure-Differential Engine Stage

Figure 3:
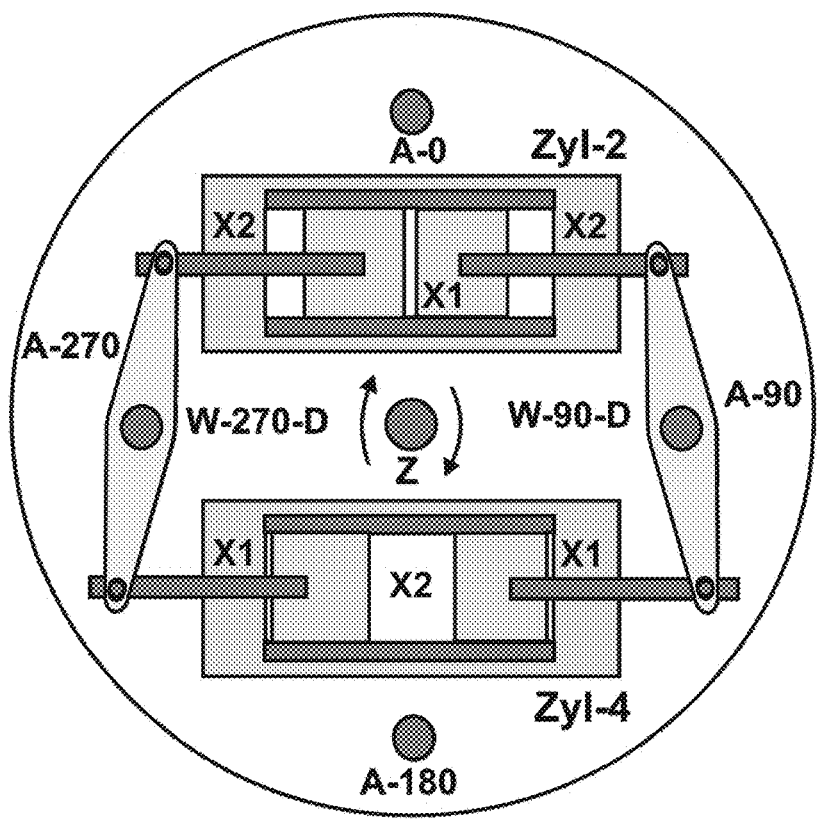
FIG. 3 is a schematic view of a next level with a pressure differential stage.

On the next level shown in FIG. 3, there is the pressure differential stage with Zyl-2 and Zyl-4. Upstream of the stage there is a high pressure in the hot exhaust gas and downstream of the stage there is a low pressure as a result of cooling and condensation. In an alternating manner, Zyl-2 on the inside and Zyl-4 on the outside are connected to the negative-pressure region and Zyl-2 on the outside and Zyl-4 on the inside are connected to the positive-pressure region.

4. Steam Engine Stage

Figure 4:
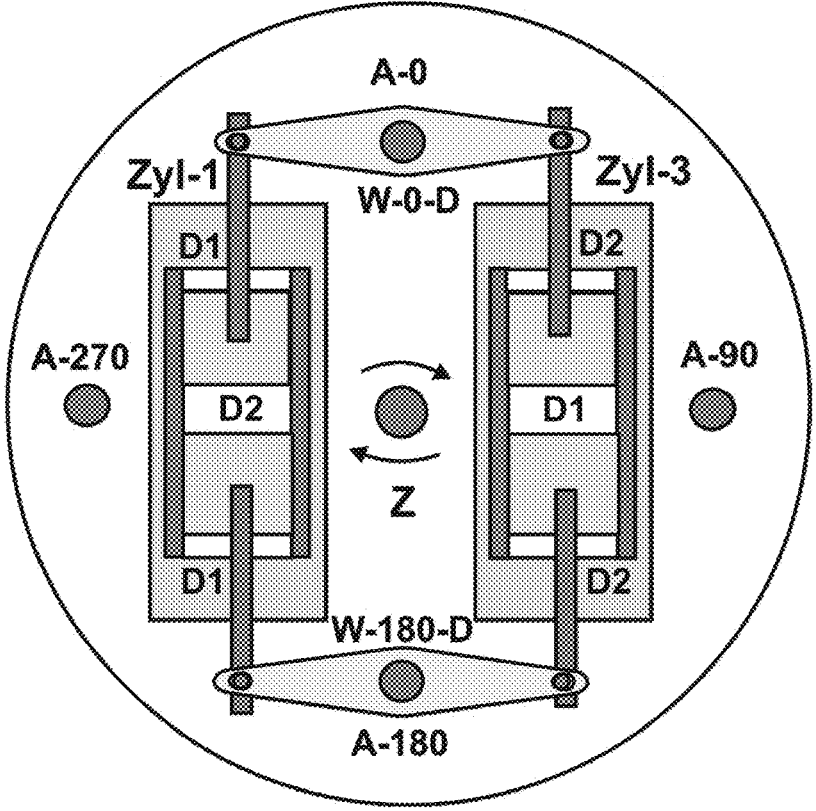
FIG. 4 is a schematic view of a steam engine stage.

Referring to FIG. 4, in a closed circuit there is a liquid (for example water), which evaporates in the hot regions of the combustion engine and condenses again in a cool region. Between cold and hot, little liquid is transported with little pressure, while between hot and cold Zyl-1 on the inside and Zyl-3 on the outside are alternately connected to the pressure of the much greater volume of steam and on the other side to the low pressure in the condensation region, and vice versa.

5. Eccentric Stage

Figure 5:
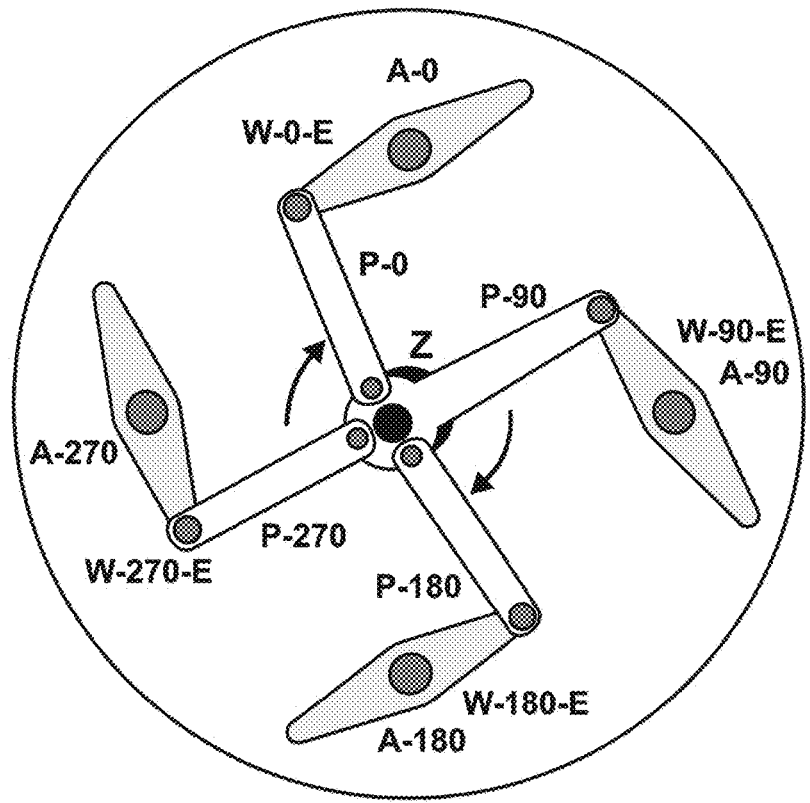
FIG. 5 is a schematic view of an eccentric stage.
Figure 8:
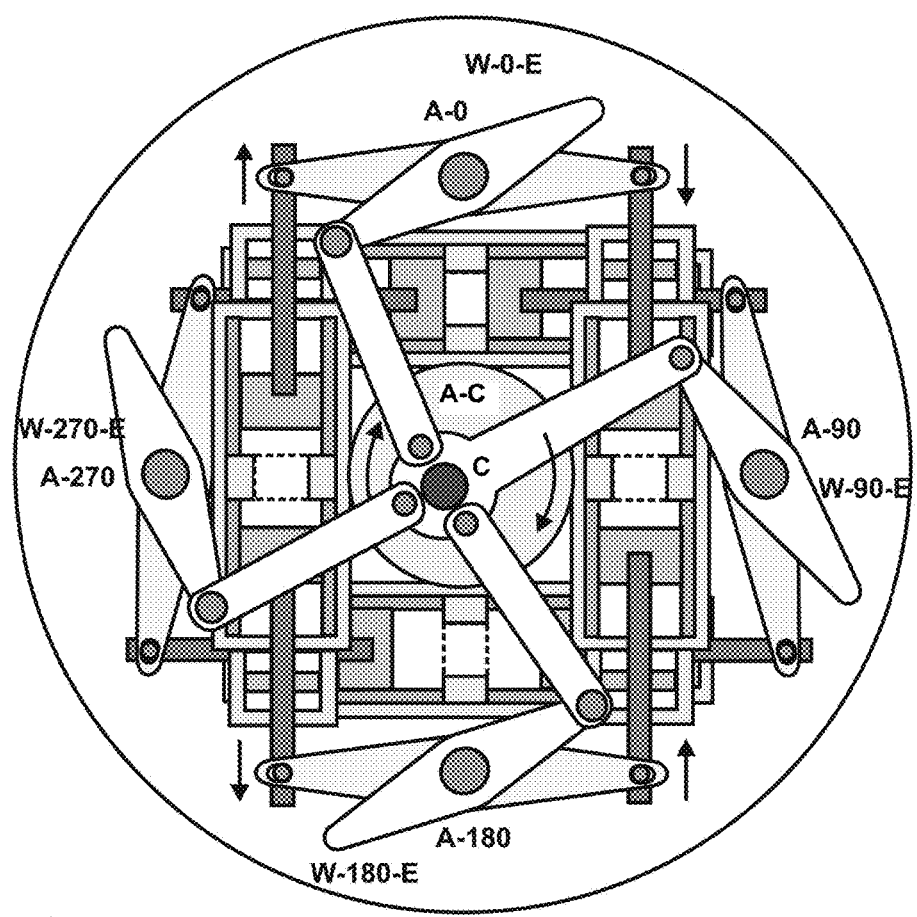
FIG. 8 is a schematic view showing the combination of the first and second levels of the combustion engine stage of FIGS. 1.1 and 1.2 with the eccentric stage of FIG. 5.

Referring to FIG. 5, the rocking movements of the four spindles A-0, A-90, A-180 and A-270 are transmitted by way of a cruciform connecting rod with 4 arms (one fixed, 3 movable) by way of an eccentric EZ attached on the central rotary spindle to the central rotary spindle, and vice versa. The rockers W-0-E, W-90-E, W-180-E and W-270-E are fastened on the rocking spindles in such a way that their arms, with which they are connected to the connecting rod, move in the direction of the midpoint of the central rotary spindle. The free arms of the rockers serve as counterweights, in order to keep the center of gravity of the connecting rod and the rocker respectively in the middle of the respective rocking spindle. It is consequently sufficient to provide the eccentric with minor measures for compensating imbalance with respect to the center of gravity of the central rotary spindle. FIG. 8 shows the eccentric stage in connection with the first and second levels of the combustion stage with the rockers of the combustion stage located on the rocking spindles A-0, A-90, A-180 and A-270 behind the rockers W-0-E, W-90-E, W-180-E and W-270 of the eccentric stage.

6. Example of a System Setup

The eccentric E connects the four rocking spindles W by way of the connecting rods P to the central spindle Z. The pistons of the engine stages (combustion stage V, hot-gas stage H, steam and/or pressure-differential stage D) are connected by way of the rocking spindles. The generator G is connected by way of the central spindle Z.

7. Disk Generator

The disk generator (or disk electric motor), driven by way of the central rotary spindle A, includes one or more generator modules G, G2 . . . Gn. Each generator has on each side of the central stator, which includes a stack of printed circuit boards (stator PCBs 1 . . . n), on which the windings are realized as printed circuits and on which control components are additionally mounted, two rotating rotors (R1 and R2), the complementing magnetic fields of which act by way of magnetic field concentrators K in the stator covers through the stator. Holes in the printed circuit boards and covers of the stator serve for cooling.

Figure 6:
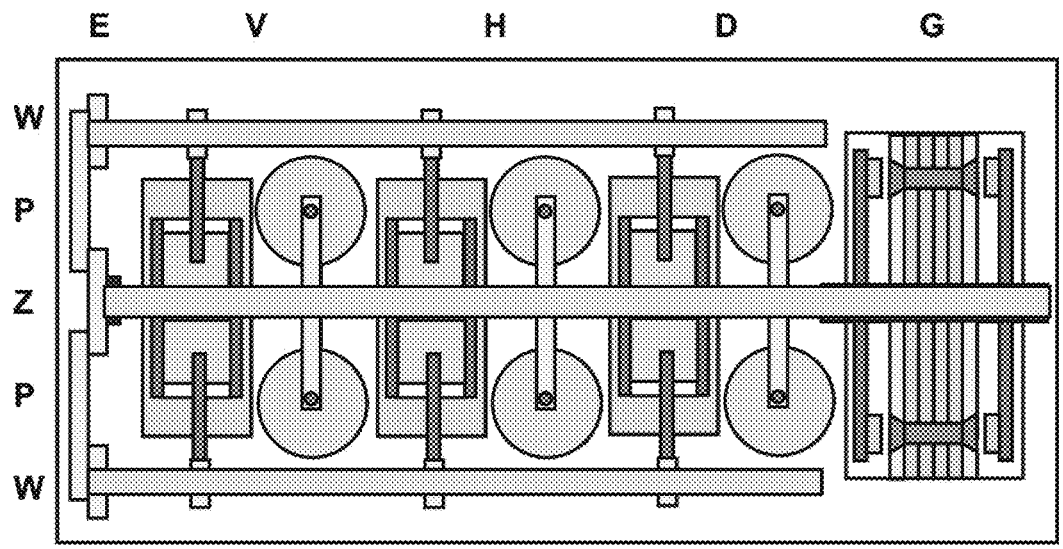
FIG. 6 is a schematic side view of an exemplary system setup.
Figure 7:
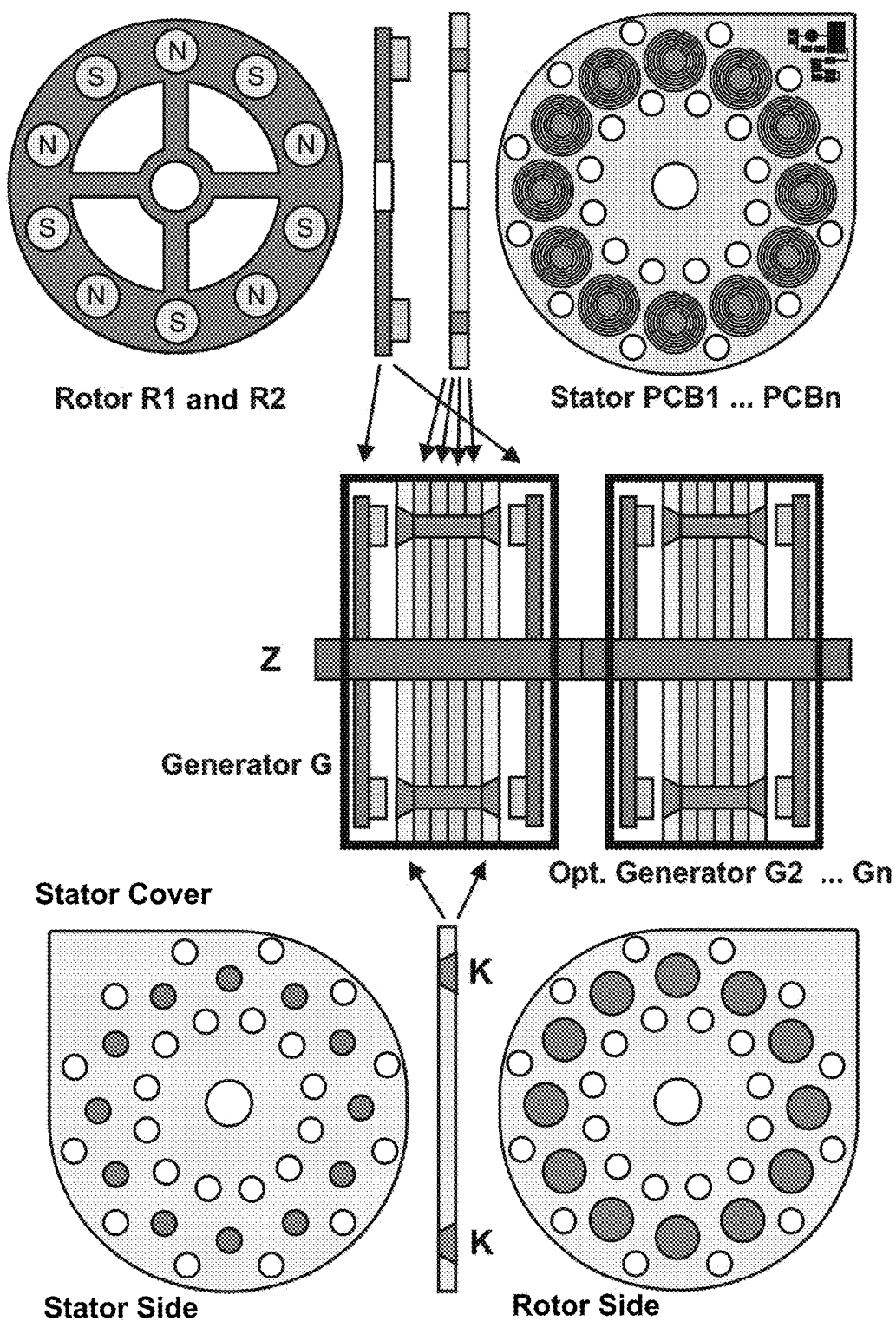
FIG. 7 is a drawing of showing the construction of an exemplary disk generator.

As shown in FIG. 6, a pressure-resistant, sealed housing is located around the entire unit. The housing completely encloses the system and the motor and the generator are separated by this housing for operation in an atmosphere that is isolated from the surroundings in terms of pressure and the gas composition. All motor- and generator-related processes take place in an environment that is optimized for the respective operation in terms of pressure and gas and liquid composition.

The invention claimed is:

1. A five-spindle engine system having a stable center of gravity, comprising:
 a central rotary spindle;
 four rocking spindles, respectively offset by 90 degrees, arranged around the central rotary spindle;
 four opposed pistons, operating in opposite directions in pairs arranged in two parallel cylinders;
 two opposing ones of said four rocking spindles in each case control movements of the four opposed pistons respectively in the two parallel-arranged cylinders by way of a respective rocker assigned to each of the two opposing ones of said rocking spindles, or take up motive energy generated in the opposed pistons to coordinate said motive energy by way of the respective rocking spindles with further drive cylinders; and
 one or more radial connecting rods connected between the two rocking spindles and a central eccentric connected to the central rotary spindle to transmit said motive energy to the central rotary spindle, and at the same time, by way of the eccentric, coordinate movement of the two opposing ones of the rocking spindles with the other two of the rocking spindles that are turned by 90 degrees relative to the two opposing ones of the rocking spindles and arranged opposite one another.

2. The engine system of claim 1, wherein the one or more radial connecting rods include one fixed and three movable connecting-rod arms.

3. The engine system of claim 1, further comprising a pressure-resistant, sealed housing which completely encloses the system and by said housing separates the system for operation in an atmosphere that is isolated from surroundings in terms of pressure and the gas composition.

4. The engine system of claim 1, further comprising an opposed-piston four-cylinder, two-stroke combustion engine system, including two of the cylinders in each case are arranged in parallel and, by way of two opposite ones of the rockers, the pistons work in each of the cylinders in pairs, opposite one another, each said cylinder is equipped with a central combustion chamber, the cylinders are coordinated in a 180-degree-offset working cycle, the cylinders being operated with low compression, so that the pistons in one of the two cylinders move away from one another when the other two pistons in the other of the two cylinder move toward one another, the two additional cylinders that are arranged offset by 90 degrees, result in four working cycles per revolution of the central spindle connected by way of the four rockers by way of the four rocking spindles via the one or more radial connecting rods.

5. The engine system of claim 4, further comprising a pressure-resistant, sealed housing which completely encloses the system and by said housing separates the system for operation in an atmosphere that is isolated from surroundings in terms of pressure and the gas composition.

6. The engine system of claim 4, wherein an angle-optimized force transmission and speed-minimized movement takes place from a linear piston movement of the pistons to the central rotary spindle, the force transmission takes place generally linearly for linear force-accepting components and generally radially for radial force-accepting components in the piston-piston rod-rocker-rocking spindle-connecting rod rocker-radial connecting rod-eccentric/rotary spindle force-transmission chain, with low speeds at points of friction.

* * * * *